United States Patent [19]

Grabowski

[11] Patent Number: 4,492,153
[45] Date of Patent: Jan. 8, 1985

[54] KNOCK-DOWN PLASTIC CHEESE CURING CONTAINER

[75] Inventor: Paul P. Grabowski, Mt. Prospect, Ill.

[73] Assignee: Kraft, Inc., Glenview, Ill.

[21] Appl. No.: 449,150

[22] Filed: Dec. 13, 1982

[51] Int. Cl.³ .............................................. A23C 19/00
[52] U.S. Cl. ........................................ 99/460; 99/452; 206/508; 206/60 D; 220/4 F; 220/1.5; 220/76
[58] Field of Search .................... 99/456–459, 99/460, 465, 452; 100/104, 116, 107–110; 217/13; 426/478, 491, 582; 425/84, 85; 220/4 F, 1.5, 76, 93, 426; 206/600, 508, 386, 410, 511

[56] References Cited

U.S. PATENT DOCUMENTS

| | | | |
|---|---|---|---|
| 3,327,882 | 6/1967 | Andrews | 220/4 |
| 3,371,816 | 3/1968 | Ricci | 220/4 |
| 3,410,441 | 11/1968 | Rhyne | 220/4 F |
| 3,502,237 | 3/1970 | Verhein et al. | 220/4 |
| 3,572,535 | 3/1971 | Kinzie | 220/4 |
| 3,589,547 | 6/1971 | Hambleton | 220/1.5 R |
| 3,589,548 | 6/1971 | Weiss | 220/4 R |
| 3,796,339 | 3/1974 | Suzuki | 217/13 |
| 3,828,964 | 8/1974 | Bonnot | 220/1.5 |
| 3,847,299 | 11/1974 | Page | 220/4 F |
| 3,917,066 | 11/1975 | Cloyd | 206/386 |
| 3,969,995 | 7/1976 | Krueger et al. | 99/458 |
| 3,974,934 | 8/1976 | Rohner | 220/4 F |
| 3,985,258 | 10/1976 | Quigley et al. | 220/4 F |
| 3,989,156 | 11/1976 | Lowry | 220/4 F |
| 4,000,827 | 1/1977 | Emery | 220/4 F |
| 4,050,604 | 9/1977 | Flanders | 220/4 F |
| 4,083,464 | 4/1978 | Burnett | 217/13 |
| 4,090,659 | 5/1978 | Galmiche et al. | 206/410 |
| 4,171,059 | 10/1979 | Heller et al. | 220/4 F |
| 4,263,330 | 4/1981 | Streeter et al. | 99/458 X |

Primary Examiner—Timothy F. Simone
Attorney, Agent, or Firm—Fitch, Even, Tabin & Flannery

[57] ABSTRACT

A knock-down cheese curing box is formed of plastic members including an individually constructed bottom tray, individually constructed side panels, and a top cover. The side panels have interfitting tabs and notches by which the side panels are slid into an interfit with each other into a rectangular tubular configuration. The bottom tray has a peripheral lip within which the rectangular tubular configuration is received.

14 Claims, 5 Drawing Figures

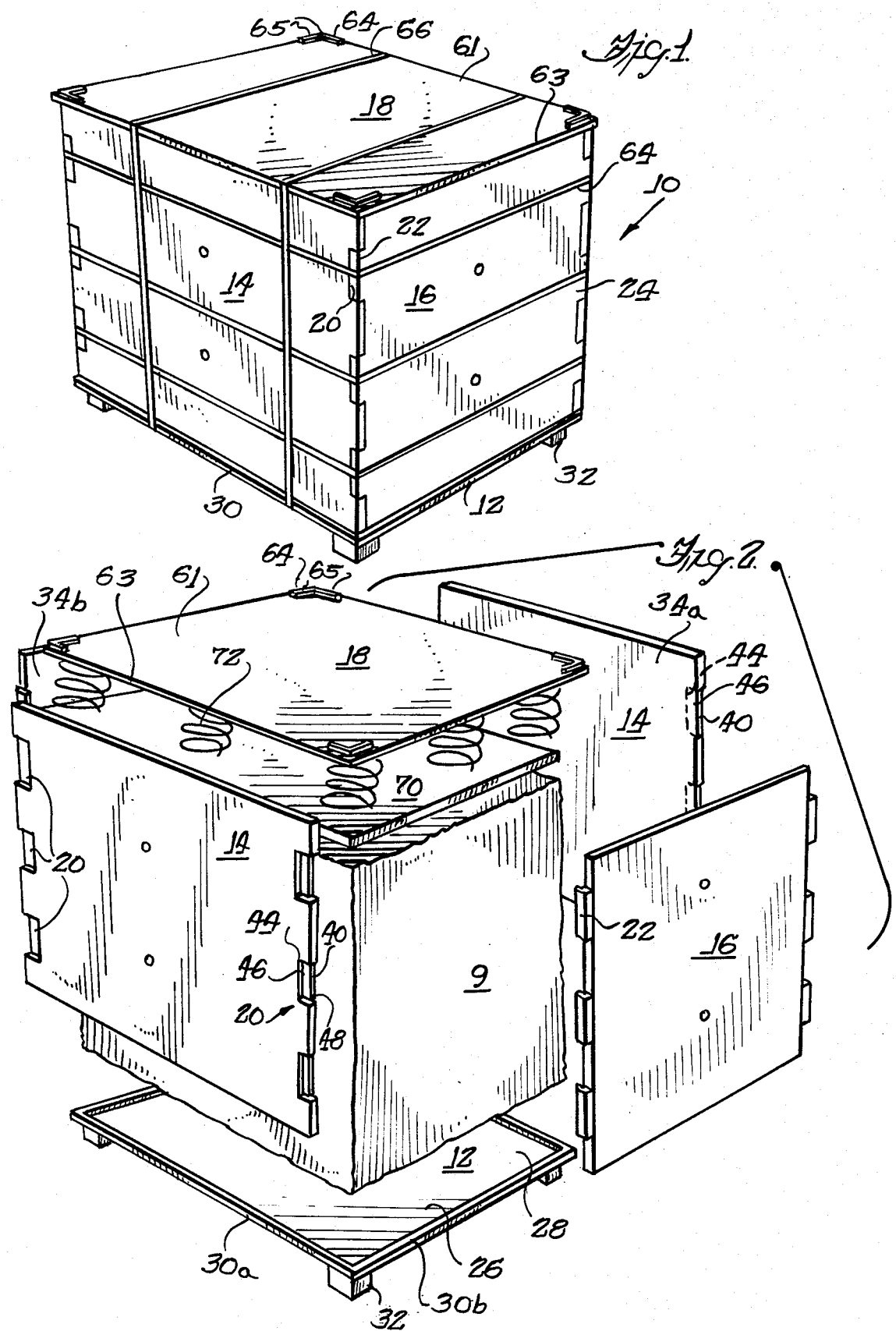

KNOCK-DOWN PLASTIC CHEESE CURING CONTAINER

The present invention relates to knock-down plastic containers and more particularly to knock-down plastic containers for curing cheese.

BACKGROUND OF THE INVENTION

As part of the process of forming natural hard cheese, such as cheddar or mozzarella, divided curd is placed under pressure to cement the small curd particles together. Traditionally, the pressed cheese curd is allowed to form a surface rind before being covered for curing, e.g., with melted paraffin. Current hard cheese making processes minimize the wasteful formation of rind by covering the cheese curds for curing immediately subsequent to pressing. It has become the practice in the cheese industry to produce hard cheese in bulk by filling large rectangular boxes with cut curd, and enclosing and pressing the curd within these boxes. Quite large blocks of bulk cheese are produced by this method, a cheddar cheese block typically weighing 640 pounds.

Conventionally, bulk cheese boxes are made of plywood and metal, painted with a non-toxic paint and then coated with paraffin wax. Conventional plywood and metal bulk cheese boxes are comprised of a substantial number of components and require a significant amount of time to set up and knock down. Between each use, the wooden components must be reconditioned, and the wooden and metal components must be rewaxed.

The sticky paraffin wax used to coat conventional cheese curing boxes clings to whatever it contacts and tends to pick up dirt and dust, which provides difficulties in maintaining cleanliness of the box components and of the immediate environment. Furthermore, the wood and metal parts create a drab appearance in the cheese curing area.

It would be desirable to have bulk cheese curing boxes which can be assembled, disassembled and prepared for reuse with minimal effort, and to this end it would be desirable to eliminate wooden parts which require refinishing and rewaxing with multiple use, and to reduce the large number of components conventional wood-metal curing box assemblies. It is also desirable that the sticky paraffin be eliminated in order to further promote cleanliness of the cheese curing boxes and in the cheese curing area.

SUMMARY OF THE INVENTION

A knock-down cheese curing box is formed of a pair of opposed, plastic, individually constructed widthwise side panels, a pair of opposed, plastic, individually constructed lengthwise side panels, and means on the vertical edges of the side panels for interfitting the side panels into a rectangular tubular configuration with the interfitting means restraining vertical movement of the side panels relative to each other. The cheese box also includes an individually constructed plastic bottom panel having means, preferably in the form of an upwardly extending lip, to locate the rectangular tubular configuration of side panels thereontop and an individually constructed cover means, preferably formed of plastic, adapted to overlie the tubular configuration and preferably having a depending peripheral lip that surrounds the upper end of the tubular configuration. The bottom panel and the side panels preferably provide smooth, flat interior surfaces.

The preferred interfitting means are notches along the vertical edge of one of each two adjacent side panels and tabs along the of the adjacent panel edge to engage the notches. Conveniently, one pair of opposed side panels has the notches and the other pair of opposed side panels has the tabs. In a specific aspect, each notch comprises an indentation from the vertical edge and an inward extension along the exterior edge of the side panel, and each engaging tab comprises a leg that is received in the indentation and a leg which is received in the inward notch extension. More specifically, the inwardly extending portion of each notch defines a narrow panel segment, and each tab provides a recess which receives an end of the narrow panel portion when the tab and notch are interfitted.

In a preferred aspect of the invention the box includes a pressure plate having dimensions substantially matched to the interior dimensions of the tubular configuration and means to push the pressure plate downward from the cover means. Means are preferably provided for restraining the side panels in interfitted relationship and for holding the cover means downward over the tubular configuration.

In accordance with an important aspect of the invention, the bottom panel has legs to space the bottom panel means above a support surface, and preferably, the top panel has means on its upper surface for locating the bottom panel legs of a similar box stacked thereontop.

The plastic members may be formed of solid high impact polystyrene, polyethylene or polypropylene, in which case, the solid polymer members are between about ½" and about 1" thick.

Alternatively, the box members are formed from polyethylene or high impact polystyrene by a structure foaming method, the box members having solid outer skins and porous interior cores.

Alternatively, the box members each have an outer shell formed of a solid polymeric material, such as polyethylene, and a foam core interior of the outer shell formed of another polymeric material, such as polyurethane foam.

Preferably the opposed widthwise panels are interchangable and the opposed lengthwise side panels are interchangable, and further preferably, the widthwise side panels and the lengthwise side panels are each symmetrical about a horizontal midline and a vertical midline, whereby the side panels may be orientated in either of two vertical orientations.

Set-up and knock-down of the boxes is simple and quick. Preparation of the box members for reuse merely involves cleaning the members. Improved cleanliness of the cheese curing plant is achieved by elimination of paraffin coatings.

BRIEF DESCRIPTION OF THE DRAWINGS

FIG. 1 is a perspective view of a cheese box embodying various features of the present invention;

FIG. 2 is an exploded perspective view of the cheese box of FIG. 1;

DETAILED DESCRIPTION OF THE PREFERRED EMBODIMENTS

Figure 3:
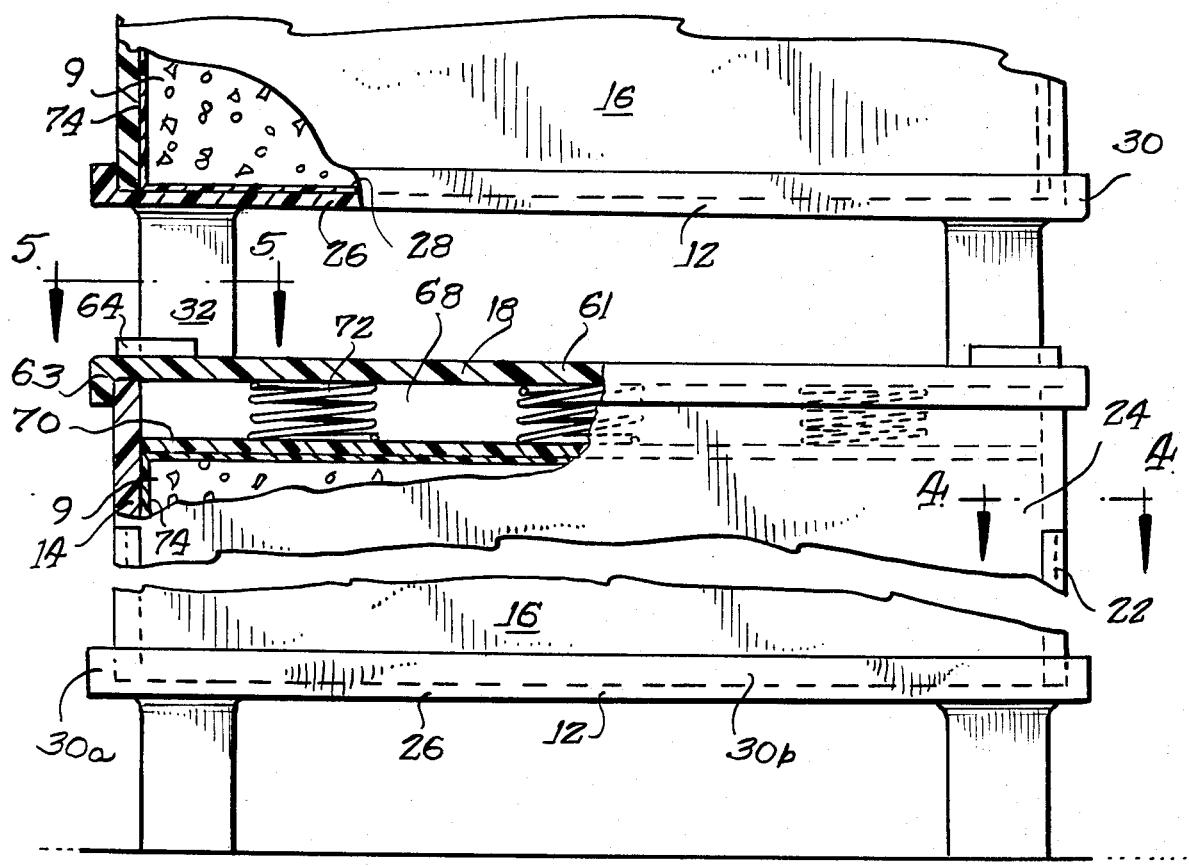
FIG. 3 is a side elevation view of one cheese box stacked on another.
Figure 5:
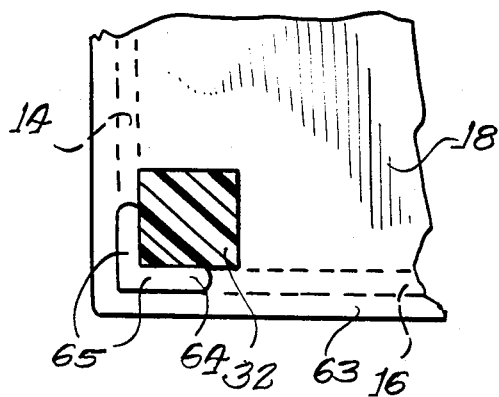
FIG. 5 is a cross-sectional view taken along line 5—5 of FIG. 3.
Figure 4:
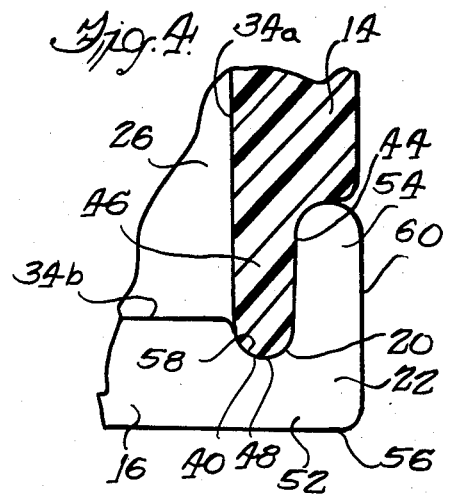
FIG. 4 is a cross-sectional view taken along line 4—4 of FIG. 3.

In accordance with the present invention, a cheese curing box 10 is formed of individual members including a bottom tray 12, four side panels 14, 16 and a top cover 18, each formed as an integral unit of a relatively rigid polymeric material. Means 20, 22 are provided for interfitting the side panels 14, 16 together in a rectangular tubular configuration 24, and means are provided for locating the side panels 14, 16 on the bottom tray 12 to define a rectangular region into which divided cheese curd may be poured and in which the cheese 9 is aged. The members are easily slid into an interfit with each other for rapid assembly and are quickly knocked down to expose the cured cheese 9. The box 10 is reassembled after the members are simply cleaned, there being no need to recondition the members or wax the members prior to reuse.

The bottom tray 12 has a flat bottom panel 26 with a flat smooth upper surface 28 and an upstanding peripheral lip 30 for locating the lower ends of the tubular configuration 24 of side panels therewithin. The upstanding lip 30 is very short, typically extending less than one inch upward from the bottom panel 26. Just inward of the four corners of the tray 12, integrally formed legs 32 depend from the undersurface of the bottom panel 26 raising the bottom panel above a support surface on which the box rests, thereby allowing tines of a lift truck to be slid underneath the box. Herein the legs 32 are each formed of solid plastic generally in the configuration of a rectangular block having a height sufficient to provide easy access by the tines of the lift truck and a cross-sectional area sufficient to support the weight of the cheese-filled box and, perhaps, several other cheese-filled boxes stacked thereon top.

Although the bottom tray 12 could be perfectly square, the illustrated box has a length greater than its width corresponding to the dimensions of currently used wooden cheese curing boxes, whereby the cheese block that is formed is processable with currently available block cutting apparatus without adjustment or retooling. Consequently, the box has pairs of opposed side panels of two different lateral dimensions, a pair of longer ones 14 which extend along lengthwise lip portions 30a of the bottom tray and a pair of shorter ones 16 which extend along widthwise lip portions 30b of the bottom tray.

In order to avoid cheese waste, the side panels 14, 16 like the bottom tray 12, all have flat smooth interior surfaces 34a, 34b (FIG. 2), and the interfitting means include cooperating tabs 22 and notches 20 adapted to interfit the side panels into the rectangular tubular configuration 24 that provides a generally perfectly rectangular region, the interfitting tabs and notches being configured to interfit the side panels together so that their flat interior surfaces 34a, 34b meet at sharp right angle junctions. Further, the interfitting tabs and notches are adapted to provide a sliding interfit between the side panels for rapid assembly and knock-down of the box 10.

The preferred interfitting means comprise a plurality of notches 20 along each vertical edge of the lengthwise side panels 14 and interlocking tabs 22 along each vertical edge of the widthwise side panels 16. (Of course, the tabs could be on the lengthwise panels and the notches on the widthwise panels. However, notches on the lengthwise panels are preferred because the tabs then provide restraint to the outward bowing of the lengthwise panels. Each panel could also have tabs along one vertical edge and notches along the other vertical edge, but such an arrangement would make assembly and knock-down slightly more difficult.) In the illustrated embodiment, three evenly spaced tabs extend from each vertical edge of each widthwise side panel for sliding into three evenly spaced notches in each vertical edge of each lengthwise side panel.

Opposite vertical edges of each side panel 14, 16 are identical so that each panel is symmetrical with respect to its vertical midline. In addition, the notches 20 and tabs 22 are evenly spaced from each other as well as from the horizontal edges so that each side panel 14, 16 is symmetrical about its horizontal midline. Accordingly, the box can be assembled irrespective of which side of the box each side panel is placed and irrespective of which horizontal edge of any side panel is orientated upwards. The symmetry and interchangeability of the side panels facilitates box set-up.

The lengthwise side panels 14 have a horizontal dimension substantially equal to the distance between the interior walls of the widthwise lip portions 30b to fit closely therebetween. The notches 20 that are formed in the vertical edges each include an outer indentation 40 less than one side panel thickness as measured from the vertical edge. The preferred notch 20 has an inward extension 44 along the exterior of the side panel 14 leaving a narrowed panel portion 46 of about one-half normal panel thickness along each notch extension. The end 48 of the narrowed portion 46 is convexly curved with the base of the end curvature beginning about one panel thickness inward from the vertical edge 42, so that in the assembled box 10, the lengthwise side panels 14 provide an uninterrupted flat interior surface 34a between the opposed interior surfaces 34b of the widthwise side panels 16.

The widthwise side panels 16 have a widthwise dimension substantially equal to the distance between the interior surfaces of the opposed lengthwise interior lip portions 30a minus two panel thicknesses, and the tabs 22 each extend outward about one panel thickness from each vertical edge. The illustrated tabs 22 are each L-shaped, having a leg 52 that extends outward in the widthwise direction and a leg 54 at the outer end thereof extending perpendicularly in the lengthwise direction. The leg 52, that extends outward from the side panel and is adapted to be received in the corresponding indentation 40, has an exterior surface 56 that is continuous with the exterior surface of the side panel 16 and an interior surface 58 that is concavely curved for receiving the curved end 48 of the narrowed panel portion 46 therealong. The perpendicular leg 54 has a thickness of about one-half panel thickness and a horizontal dimension matched to the inward extension 44 of the corresponding notch 20 to be received in a close fit therewith and its exterior surface 60 substantially flush with the exterior surface of the lengthwise side panel 14.

Thus the side panels 14, 16 and their notches 20 and tabs 22 are proportioned to slide horizontally into an interfit to form the rectangular tubular configuration 24 with a nearly perfectly rectangular interior as well as generally smooth exterior surfaces that fit closely within the upstanding lip 30 of the bottom tray 12. With the notches 20 and tabs 22 slid into an interfit with each other, the side panels 14, 16 are restrained by the notches and tabs from collapsing inward toward the vertical axis of the rectangular configuration. The vertical dimension of the tabs 22 are closely matched to the vertical dimension of the notches 20 so that when the notches and tabs are interfitted, they restrain the side panels 14, 16 from vertical movement relative to each other.

The top cover 18 is shaped similar to the bottom tray 12 having an upper panel 61 with a short depending peripheral lip 63 that surrounds the upper end of the rectangular tubular configuration 24. Corresponding to the bottom panel legs, the cover 18 has locating means in the form of protrusions 64, each consisting of a pair of perpendicular segments 65. The interior surfaces of the protrusions collectively define a rectangular region in which legs 32 of a bottom tray 12 stacked thereontop locate. Depending on the strength of polymeric material used to form the box members, the thickness of the walls, typically between about ½ inch and about 1 inch, and the weight of the cheese filled boxes, up to about four cheese-filled boxes may be stacked on top of each other.

Although the box members interfit with each other, they preferably do not directly interlock in order that they may be slid into interfit with each other and rapidly knocked down by sliding them apart after the cheese is cured. Instead, the interfitted members are interlocked by means of metal, plastic or fiber straps 66 (FIG. 1) in a conventional manner, a plurality, e.g., 2-5, horizontal straps circumventing the side panels 14, 16 and a plurality of straps, e.g., 2-3, vertically wrapped around the box holding the top tray down on the box.

The height of the box is somewhat greater than the depth to which it is filled with cut curd providing a void region 68 (FIG. 3) above the curd where cheese pressing means are located. A flat plate 70, preferably formed of the same plastic material of which the box 10 is formed and having dimensions matched to the interior dimensions of the tubular configuration 24, is placed in the box 10 over the cheese, and a plurality of coiled springs 72 are compressed between the top cover 18 and the plate 70 when the top cover 18 is strapped to the box.

Although the several box members are proportioned to closely interfit, the interfit is not liquid-tight. Generally, the assembled box 10 will be lined with a film of polymeric material 74 (FIG. 3), such as that known generally as saran, to provide a substantially liquid-tight covering for the cheese during curing and to further insure against contamination of the cheese. After curing, the film facilitates removal of the box members from the cheese, preventing cheese from sticking to the box members.

To assemble the box, the four side panels 14, 16 are slid horizontally together to form the rectangular tubular configuration 24, and this tubular configuration is then placed within the bottom tray 12. Metal straps 66 are banded around the side panels to lock them tightly together. The open container is lined with film 74 and is then filled with divided curd. After covering the top of the curd with additional film, the pressure plate 70, the coiled springs 72 and the cover 18 are placed on top of the curds. Straps 66 are then wrapped vertically around the box 10 and drawn tight forcing the cover downward over the upper edge of the tubular configurations 24 and compressing the springs 72 to apply pressure to the plate 70 and the curds therebelow.

After sufficient time has passed for the cheese to cure, the bands 66 are cut, the cover 18, springs 72 and pressure plate 70 removed, and the side panels 14, 16 are slid away from the cheese leaving the block of film-wrapped cheese sitting in the bottom tray 12 where it can be unwrapped, dumped onto a conveyer and transferred to cutting apparatus.

After knock-down, the members are washed and are immediately ready to reuse. There is no need to ever coat the plastic box members with paraffin or the like as is the case with wood and metal boxes previously used.

The polymeric material of which box members are formed is selected to provide sufficient strength so that the side panels of the box do not bulge excessively when the cheese is placed under pressure. It is preferred that the strength and rigidy be achieved without producing a box of excessive weight.

The box members may be formed of a solid polymeric material, such as polypropylene, polyethylene, or high impact polystyrene. The thickness of the members sufficient to provide sufficient flexural strength so that the box does not bulge excessively when filled. Disadvantageously, solid members of adequate thickness (typically between about ½" and 1") tend to be undesirably heavy. For example, it is found that box members formed of polypropylene should be about ¾ inch thick to provide adequate flexural strength, resulting in a cheese curing box that is somewhat heavier than conventional wood and metal boxes.

Lighter plastic cheese curing boxes are produced by techniques which produce box members with smooth outer surfaces and porous cores or interiors.

One such technique is structural foaming in which a molten polymeric material, such as high impact polystyrene or polyethylene, is injected along with a blowing agent into a mold held under a pressure that prevents foaming of the plastic. As the plastic contacts the cooler mold, it solidifies forming a solid outer skin. Then, pressure is removed from the plastic by allowing the mold to expand, and gas bubbles foam the still molten interior. Polyethylenes and high impact polystyrenes are suitable polymeric materials for structural foaming. A specific material which has been found suitable for structural foaming is polystyrene, sold as Amoco Medium Impact P.S. Resin Grade M9RC7-Natural. The blowing agent may be a gas, such as nitrogen, under pressure or a solid material, such as an azo-dicarbonamide which decomposes to yield gaseous products, i.e., nitrogen and carbon dioxide, at the elevated temperature of the molten plastic. Solid blowing agent is added to the plastic resin at between about one and about ten weight percent.

Another method of forming lightweight plastic box members is by a rotomolding process. This process is the method of choice for limited production as it produces a relatively lightweight box with relatively inexpensive molds. According to this method, a mold is filled with polymeric resin, such as polyethylene, and the mold is heated and rotated. The resin melts and forms a layer that covers all interior surfaces of the mold as the mold is rotated, and as the mold is subsequently cooled, the layer solidifies into a shell with an interior void region. An access opening is drilled to the interior void region and the mold placed in a rigid device. The interior void region is filled with polyurethane material that foams to a relatively rigid porous polyurethane, the rigid device preventing significant deformation of the shell during polyurethane foaming.

By way of specific example, members of a curing box 10 for processing 640 pounds of cheddar cheese are rotomolded. The rotomolded plastic parts have medium density polyethylene outer shells formed of MDPEG resin 7149 sold by Union Carbide and interior cores formed of Witco R-0810 polyurethane. The walls of the polyethylene shell have an average thickness of about 2/10ths of an inch with the polyurethane foam comprising the remaining interior region. The total weight of the boxes range between about 60 and about 80 pounds, which compares very favorably with comparable wood and metal cheese curing boxes that typically weight about 110 pounds.

The bottom tray 12 including the integral peripheral lip 30, is formed of ½ inch plastic, the dimensions of the bottom panel between the lips being 23.6" by 29.6". The depending legs 32, which are spaced about ½ inch inward from the upwardly extending lips 30, are 3.75 inches high and have 2.5×2.5 inch cross sections. The top cover 18 is identically proportioned except that it has four upwardly extending right angle protrusions 64, each segment 65 being about 2 inches long as measured along its exterior surface and having an inner surface proportioned to precisely locate the legs 32 of a bottom tray 12.

The lengthwise side panels 14 are 30 inches high, 29.5 inches wide and ¾ inch thick. Three evenly spaced notches 20 are provided along each vertical edge, each notch having a height of about 4 inches. The indentations 40 are recessed from the vertical edges ½ inch, the exterior extensions 44 extend slightly over 1 inch therebeyond, leaving a narrowed portion 46 of one-half panel thickness and having a rounded end 48 with about a ¼ inch radius.

The widthwise side panels 16 are each 30 inches high, 22 inches wide and ¾ inch thick. The tabs 22 along each vertical edge 50, which correspond to the notches 20 of the side panels, each having an outwardly extending leg 52 slightly greater than ¾ inch long as measured along its exterior surface and a perpendicular leg 54 about 1½ inches long as measured along its exterior surface and about a one-half panel thickness. The interior surface of the outwardly extending leg 52 provides a concave recess 58 proportioned to fit closely along the curved end 48 of the narrowed panel portion 46.

The invention provides a cheese curing box having a number of advantages over the wooden boxes which it replaces. Although, the initial cost of the plastic box is higher than the cost of a wooden curing box, the minimization of upkeep, including eliminating the need to coat box members with paraffin, lowers the extended-term cost of a plastic cheese-curing box relative to a wood curing box. The interfitting means integrally formed with the plastic members eliminate the need for metal fittings, such as those currently used to join wooden box members, as well as the additional labor costs associated with joining wooden box panels with metal fittings. The plastic members are strong and not easily broken.

Improved cleanliness is an important attribute of the cheese curing boxes of the present invention. The flat smooth surfaces of the members are easily cleaned between use and require no refurbishing or coating. Importantly, the mess caused by paraffin coatings is eliminated and the plastic members do not gather dirt and dust like paraffin-coated members.

The members slide into an interfit with each other and are easily assembled by a single worker. Opposed side panels are identical and, thus, interchangable. The side panels are each symmetrical about a horizontal and a vertical midline permitting them to be assembled in either of two vertical orientations. When knocked-down, the generally flat members can be stored in a compact region, the flat members when stacked occupying relatively little space. Plastic members may be built to the same dimensions as wooden boxes and may be handled with the same lifting apparatus.

While the invention has been described in terms of a preferred embodiment, modifications obvious to one with ordinary skill in the art may be made without departing from the scope of the invention. For example, the cover, which does not contact the cheese, may be formed of a material other than that which is used to form cheese-contacting bottom tray and side panels. While high impact polystyrenes and polyolefins are the preferred polymeric material for forming the box members, other polymeric materials may be utilized, providing they are sufficiently rigid so as not to be deformed when subject to substantial pressure and provided they are not prohibitively expensive. The preferred embodiment has been described in terms of having side panels of equal thicknesses, but if this is not the case, appropriate adjustments in proportioning would be made. Other interfitting means might be used in place of the notch-tab arrangement described herein, ranging from a simple mortise-tenon arrangement to interfitting means which also interlock, e.g., with a snap fit.

Various features of the invention are set forth in the following claims.

What is claimed is:

1. A knock-down cheese curing box comprising
a first pair of plastic, opposed, individually constructed, unitary, rectangular side panels each having a flat, smooth cheese-contact interior surface and vertical edges,
a second pair of plastic, opposed, individually constructed, unitary, rectangular side panels, each having a flat, smooth, cheese-contact interior surface and vertical edges,
each of said first pair side panels having notch means along each vertical edge providing for joining to said second pair side panels and each of said second pair side panels having tab means along each vertical edge for sliding horizontally inward into noninterlocking engagement with said notch means forming a tubular configuration of said pairs of side panels, said notch means and said engaged tab means restraining vertical movement of said side panels relative to each other,
an individually constructed, rectangular, plastic bottom tray, said bottom tray having a flat bottom panel and leg means for supporting said bottom panel above a support surface to allow lifting apparatus to be inserted therebelow, said bottom panel having an upper surface with lip means upstanding therefrom for locating said tubular configuration of side panels freestanding on an area of said top surface defined inward of said lip means, said lip means being of such minimal height as to permit said tubular configuration to be collapsed while filled with a block of cured cheese by sliding said engaged side panels horizontally outward from each other to leave the cured cheese block sitting on said self-supporting bottom tray, said top surface of said bottom panel interior of said lip means being flat and smooth for cheese contact,
said side panels and said bottom tray being formed having solid outer plastic skins and porous plastic interior cores.

a plastic pressure plate having peripheral dimensions substantially matched to the interior dimensions of said tubular configuration and having a smooth, flat, cheese-contact lower surface, an individually constructed cover adapted to overlie said tubular configuration, means interposed between said cover and said pressure plate for biasing said pressure plate away from said cover, means for restraining said side panels in interfitted relationship to each other, and means for holding said cover means downward over said tubular configuration with said biasing means exerting downward pressure on said pressure plate.

2. A box according to claim 1 wherein said side panels and said bottom panel are formed of solid polymer selected from the group consisting of high impact polystyrene, polyethylene and polypropylene.

3. A box according to claim 2 wherein said side panels and said bottom panel are between about ½" and about 1" thick.

4. A box according to claim 1 wherein said side panels and said bottom panel are formed by a structure foaming method, said side panels and said bottom panel having solid outer skins and porous interior cores.

5. A box according to claim 4 wherein said box is formed of a polymer selected from the group consisting of polyethylene and high impact polystyrene.

6. A box according to claim 1 wherein said solid polymeric material outer shell is polyethylene and said core is polyurethane foam.

7. A box according to claim 1 wherein each of said notch means comprises an indentation from said vertical edge and an inward extension along the exterior of said one side panel, and said engaging tab means each comprises a leg which is received in said indentation and a leg which is received in said inward notch extension.

8. A box according to claim 7 wherein said indentation and said inwardly extending portion defines a narrow panel segment, and said tab provides a recess which receives an end of said narrow panel portion when said tab and notch are interfitted.

9. A box according to claim 1 wherein said cover has a depending peripheral lip that surrounds the upper end of said tubular configuration.

10. A box according to claim 1 wherein one of said pairs of side panels has a greater lateral dimension than the other pair of side panels, and said longer pair of side panels carries said notch means and said shorter pair of side panels carries said tab means.

11. A box according to claim 1 wherein each of said side panels are symmetrical about a horizontal midline and also symmetrical about a vertical midline, whereby each of said side panels may be oriented in said tubular configuration in either of two vertical orientations.

12. A box according to claim 1 wherein said lip means is a continuous peripheral lip.

13. A box according to claim 1 wherein said lip means is less than about 1 inch high.

14. A box according to claim 1 wherein said top panel has means on its upper surface for locating the bottom tray leg means of a similar box stacked thereon top.

* * * * *